United States Patent

Imamura et al.

[11] Patent Number: 5,847,877
[45] Date of Patent: Dec. 8, 1998

[54] DIFFRACTIVE OPTICAL ELEMENT

[75] Inventors: Ayami Imamura; Tetsuya Ishii, both of Hachioji, Japan

[73] Assignee: Olympus Optical Co., Ltd., Tokyo, Japan

[21] Appl. No.: 525,292

[22] Filed: Sep. 7, 1995

[30] Foreign Application Priority Data

Sep. 12, 1994 [JP] Japan .................................. 6-217420
Dec. 13, 1994 [JP] Japan .................................. 6-308835

[51] Int. Cl.$^6$ .............................. G02B 5/18; G02B 27/44
[52] U.S. Cl. ............................ 359/566; 359/574; 359/576
[58] Field of Search .................................. 359/576, 574, 359/571, 569, 566

[56] References Cited

U.S. PATENT DOCUMENTS

| 5,048,925 | 9/1991 | Gerritsen et al. | 359/569 |
| 5,161,059 | 11/1992 | Swanson et al. | 359/565 |
| 5,296,949 | 3/1994 | Pennace | 359/2 |
| 5,363,220 | 11/1994 | Kuwayama et al. | 359/3 |
| 5,457,573 | 10/1995 | Iida et al. | 359/569 |

FOREIGN PATENT DOCUMENTS

| 64-61726A | 3/1989 | Japan . |
| 2-43503A | 2/1990 | Japan . |
| 3191319 | 8/1991 | Japan . |
| 5-66370A | 3/1993 | Japan . |

OTHER PUBLICATIONS

Malacara, et al., "Handbook of Lens Design," New York: Marcel Dekker, Inc., 1994, pp. 633–636, 638 and 639.
G.J. Swanson, "Binary Optics Technology: The Theory and Design of Multi–Level Diffractive Optical Elements", Massachusetts Institute of Technology, Lincoln Laboratory, Technical Report 854, Aug. 14, 1989, pp. 1–47.

Primary Examiner—Jon W. Henry
Assistant Examiner—Mark A. Robinson
Attorney, Agent, or Firm—Stevens, Davis, Miller & Mosher, L.L.P.

[57] ABSTRACT

A diffractive optical element including a first layer made of a first optical material having high refractive index and low dispersion, and a second layer made of a second optical material having low refractive index and high dispersion. The first and second layers are stacked together. The outer surfaces of the first and second layers are substantially smooth, while the connecting surfaces of the first and second layers are substantially contoured to follow a relief pattern. To satisfy a preferred operating wavelength range of 400 nm to 700 nm, a glass selected from the group consisting of BSM7, BSM81, BSL7, BAL5, BAL50, BAL22, LAL11, LAL12, LAL18, YGH51, LAH57 and LAH75 may be used as the first optical material, and a silicate glass containing certain amounts (e.g., 2 to 25 mol %) of $Tl_2O$ may be used as the second optical material.

9 Claims, 10 Drawing Sheets

FIG_1
PRIOR ART
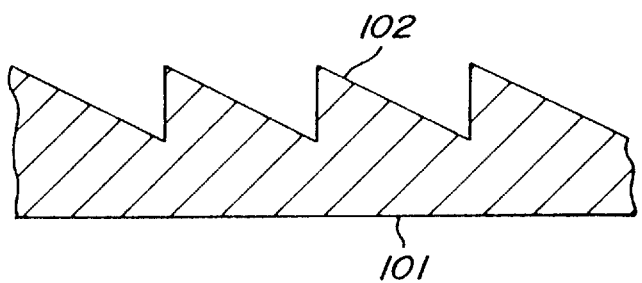
FIG_2
PRIOR ART
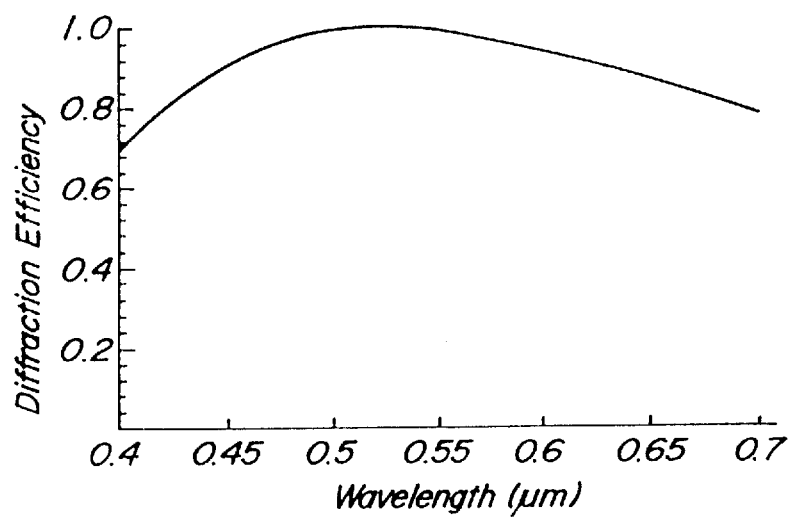

FIG_9
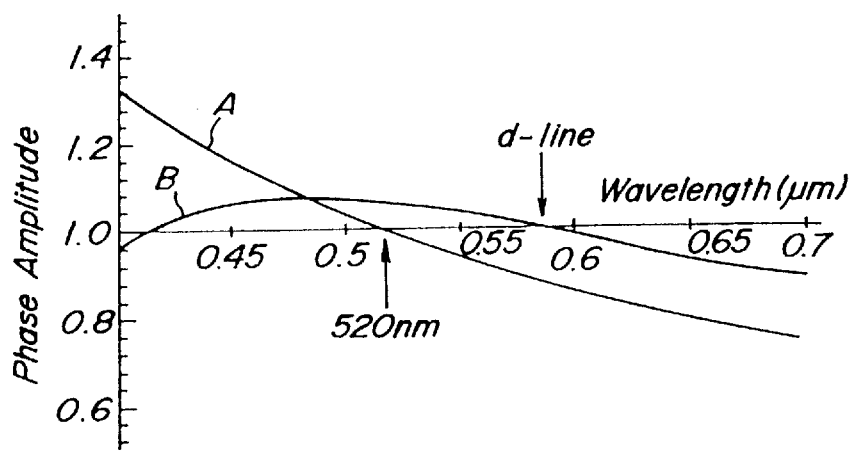
FIG_10
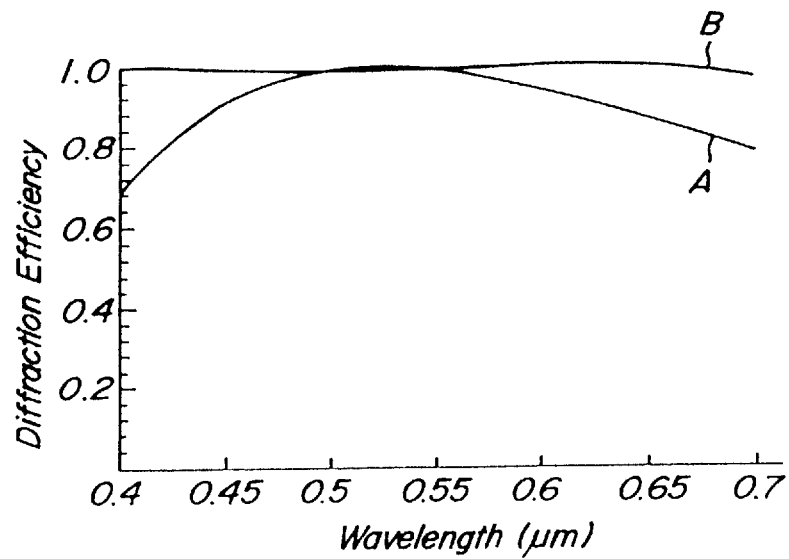

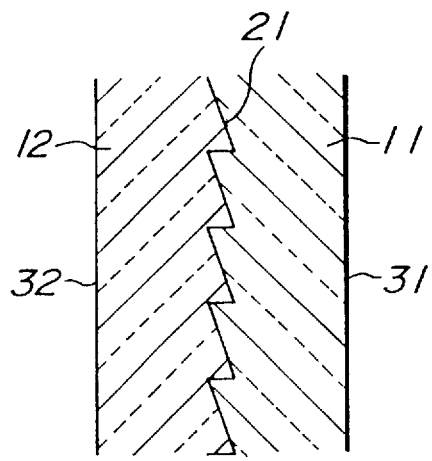
FIG_11
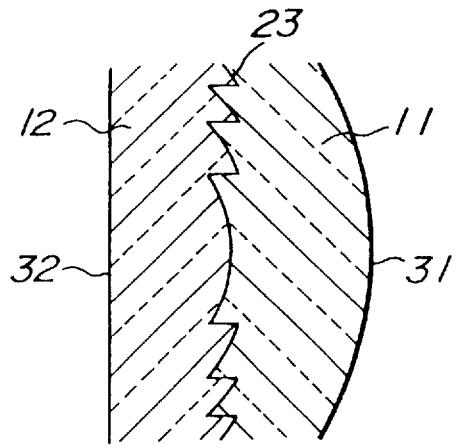
FIG_12
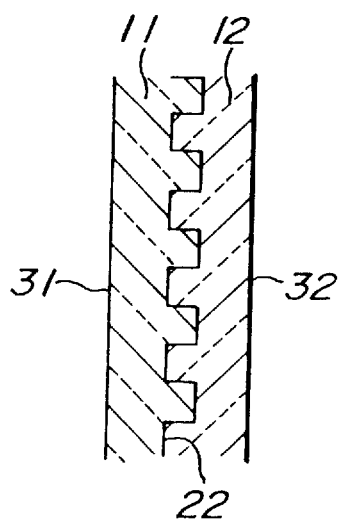
FIG_13

FIG_14
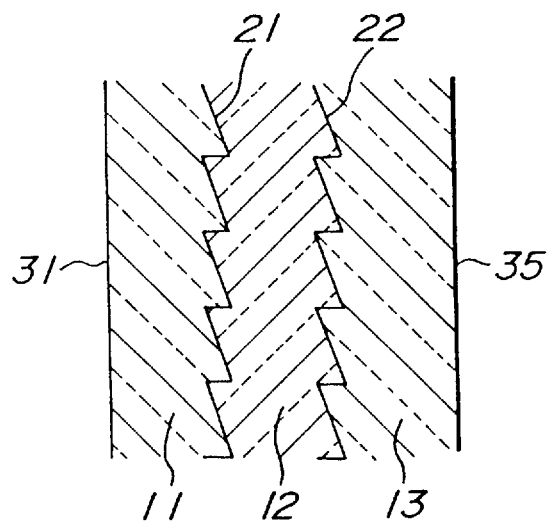
FIG_15
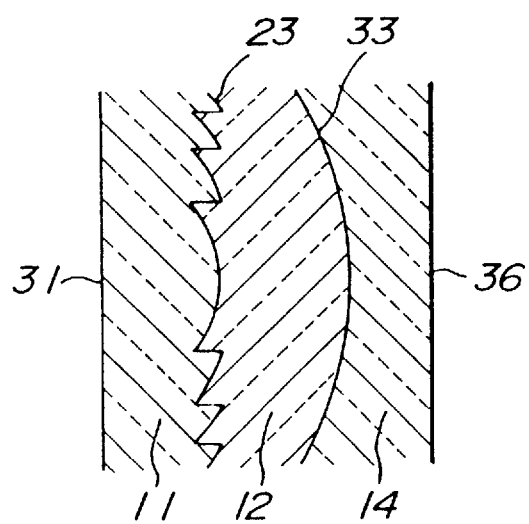

FIG_17
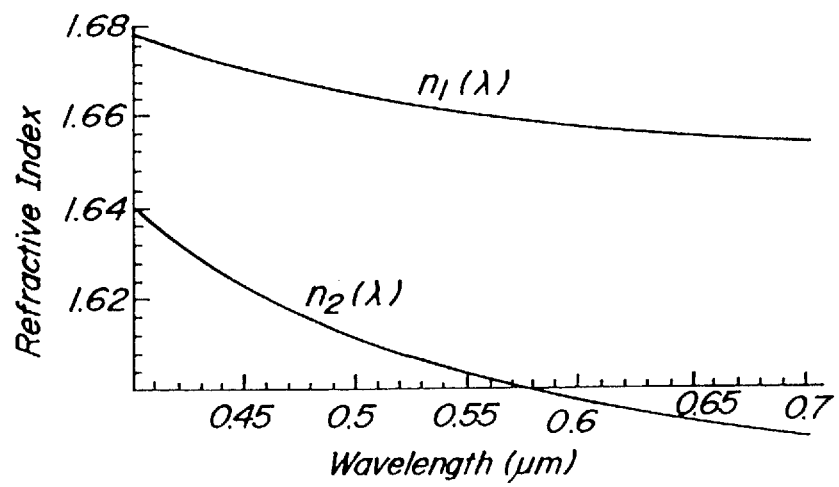
FIG_18
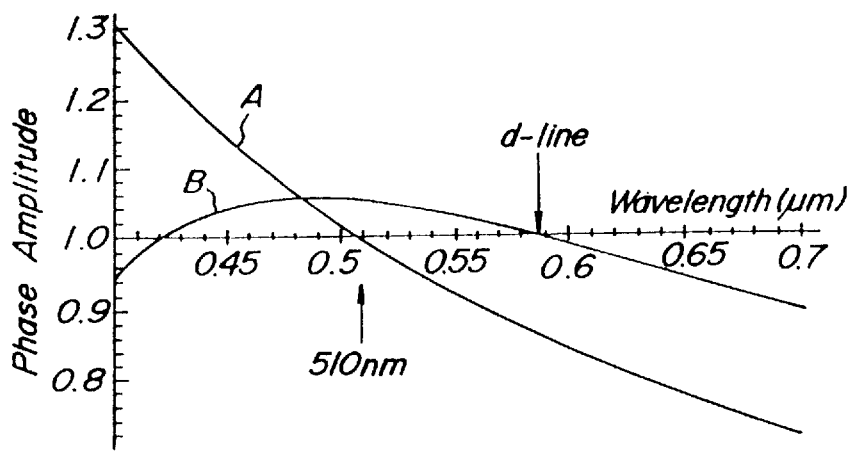

FIG_19
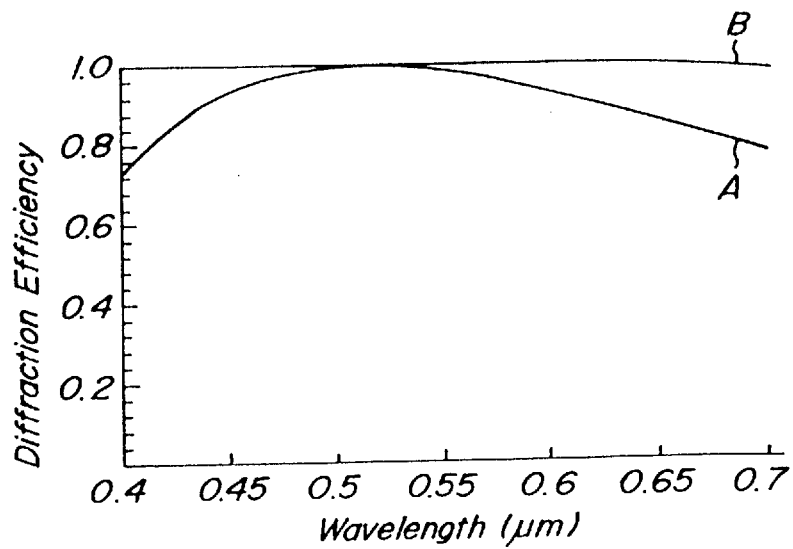
FIG_20
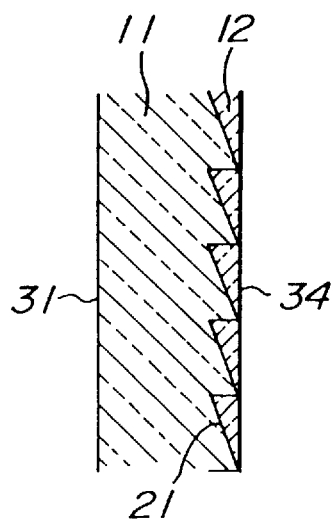

DIFFRACTIVE OPTICAL ELEMENT

BACKGROUND OF THE INVENTION

1. Field of the Invention

The present invention relates to a diffractive optical element comprising a plurality of layers stacked one another to form at least one boundary surface formed by adjacent layers made of different optical materials and a relief pattern formed in said boundary surface, and more particularly to a diffractive optical element having a decreased wavelength dependency of diffraction efficiency for a wide wavelength range.

2. Related Art Statement

The diffractive optical element of the kind mentioned above is constituted as, for instance a diffractive lens having a converging power. Such a diffractive lens has the following advantages as compared with an ordinary refractive lens.

① The diffractive lens can easily produce an aspherical wave, so that aberrations can be corrected effectively.

② The diffractive lens does not substantially have a thickness, so that an optical system including such diffractive lens can be made compact and a freedom of design can be improved.

③ In the diffractive lens, a quantity corresponding to a dispersion of the diffractive lens has a negative value, and thus aberrations can be corrected effectively.

The diffractive optical element having the above advantages can improve a property of an optical system as described in, for instance Binary Optics Technology; The Theory and Design of Multi-level Diffractive Optical Element, Gary J. Swanson, Technical Report 854, MIT Lincoln Laboratory, August 1989. In this known diffractive optical element, a sawtooth relief pattern is simulated by multi-level steps.

As stated above, the diffractive optical element has many advantages over the ordinary refractive optical element. However, a diffraction efficiency of the diffractive optical element has a relatively large wavelength dependency, so that there are several problems to be solved. When the diffractive optical element is used as a lens element, it is undesired that there are formed a plurality diffracted light rays, i.e. a plurality of focal points. Therefore, in a conventional diffractive lens shown in FIG. 1, a surface of a transparent substrate 101 is machined to have a sawtooth relief pattern 102 such that radiant energy is constricted to a diffracted beam having a predetermined order.

When the surface of the substrate 101 is machined into the sawtooth shape as shown in FIG. 1, a wavelength of the diffracted beam to which energy is constricted is dependent upon a depth of recesses of the relief pattern 102. Therefore, it is impossible to constrict energy of light beams within a wavelength range. This phenomenon does not cause any problem for a monochromatic radiation beam such as a laser beam, but could not be ignored for an optical system such as a camera in which white light is dealt with.

When a plurality of wavelengths are used, in order to correct a chromatic aberration a diffraction efficiency has to be optimized for a predetermined single wavelength. Then a diffraction efficiency is decreased for wavelengths other than said predetermined wavelength. Particularly, when the diffractive optical element is applied to an image pick-up optical system for picking-up a visible light image, there might be produced variation in color and flare due to light beams of undesired orders.

FIG. 2 is a graph showing a wavelength dependency of a first order diffraction efficiency of the known diffractive optical element having the substrate 101 made of BK7 and the relief pattern 102 having such a depth that a first order diffraction efficiency becomes 100% for a wavelength $\lambda=520$ nm. As can be seen from the graph of FIG. 2, within a visible wavelength range from 400 nm to 700 nm, a diffraction efficiency becomes maximum at a wavelength of 520 nm and becomes smaller as a wavelength departs from the optimum wavelength of 520 nm. Particularly, a diffraction efficiency is decreased largely when a wavelength becomes shorter than 520 nm. Such a decrease in a diffraction efficiency for wavelengths other than the predetermined wavelength might cause undesired effect upon an optical system due to an increase in light beams of undesired orders. This apparently affects the function of the optical system including the diffractive optical element.

SUMMARY OF THE INVENTION

The present invention has for its object to provide a novel and useful diffractive optical element, in which a wavelength dependency of a diffraction efficiency is decreased and generation of undered variation of color and flare due to undesired order beams.

According to the invention, a diffractive optical element comprising a plurality of layers including at least one boundary plane formed by adjacent layers made of different optical materials and a relief pattern formed in said boundary plane, and more particularly to a diffractive optical element used for a plurality of wavelengths, wherein first and second adjacent layers between which said relief pattern is formed are made of optical materials having refractive indices $n_1(\lambda)$ and $n_2(\lambda)$, respectively which satisfy the following conditions for arbitrary wavelengths $\lambda_1$ and $\lambda_2$:

$$n_1(\lambda) > n_2(\lambda)$$

$$\frac{n_1(\lambda_2) - n_2(\lambda_2)}{n_1(\lambda_1) - n_2(\lambda_1)} > \frac{n_1(\lambda_2) - 1}{n_1(\lambda_1) - 1}$$

wherein $\lambda_1 < \lambda < \lambda_2$.

In a preferable embodiment, said wavelengths $\lambda_1$ and $\lambda_2$ are set to 400 nm and 700 nm, respectively. Then the diffractive optical element may be made of various optical materials, so that an optimum combination of optical materials of the first and second layers can be attained.

In a preferable embodiment of the diffractive optical element according to the invention, said second layer having refractive index $n_2(\lambda)$ is formed by a glass including $Tl_2O$. Then, the first layer having refractive index $n_1(\lambda)$ may be selected from a group consisting of many commercially available optical glasses. For instance, when said second layer is made of a silicate glass containing $Tl_2O$ by an amount from 2.00 mol % to 25.00 mol %, said first layer having refractive index $n_1(\lambda)$ is made of a glass selected from the group consisting of BSM7, BSM81, BSL7, BAL5, BAL50, BAL22, LAL11, LAL12, LAL18, YGH51, LAH67, LAH55, LAH57 and LAH75.

In order to improve an optical property of the diffractive optical element, it is preferable to form the relief pattern such that a depth d and a pitch T of recesses of the relief pattern satisfy the following condition:

$$T^2 > \frac{4\pi\lambda d}{n_1(\lambda) + n_2(\lambda)}$$

BRIEF DESCRIPTION OF THE DRAWINGS

FIG. 1 is a cross sectional view showing a known diffractive optical element;

FIG. 2 is a graph representing a wavelength dependency of a diffraction efficiency of the known diffractive optical element;

FIG. 9 is a graph showing wavelength dependencies of phase amplitude of the known diffractive optical element and the first embodiment of the diffractive optical element according to the invention;

FIG. 10 is a graph illustrating wavelength dependencies of diffraction efficiency corresponding to those of phase amplitude shown in FIG. 9;

FIG. 11 is a cross sectional view showing a principal structure of the diffractive optical element according to the invention;

FIG. 12 is a cross sectional view depicting a structure of a modification of the diffractive optical element according to the invention;

FIG. 13 is a cross sectional view showing an embodiment of the diffractive optical element according to the invention, in which the relief pattern includes rectangular recesses;

FIG. 14 is a cross sectional view showing an embodiment of the diffractive optical element according to the invention including two boundary planes;

FIG. 15 is a cross sectional view illustrating another embodiment of the diffractive optical element according to the invention;

FIG. 17 is a graph showing wavelength dependencies of refractive index of two optical materials forming the relief pattern boundary plane in a second embodiment of the diffractive optical element according to the invention;

FIG. 18 is a graph representing wavelength dependencies of phase amplitude of the known diffractive optical element and the second embodiment of the diffractive optical element according to the invention;

FIG. 19 is a graph illustrating wavelength dependencies of diffraction efficiency corresponding to those of phase amplitude shown in FIG. 18; and FIG. 20 is a cross sectional view showing an embodiment of the reflection type diffractive optical element according to the invention.

DESCRIPTION OF THE PREFERRED EMBODIMENTS

Figure 3:
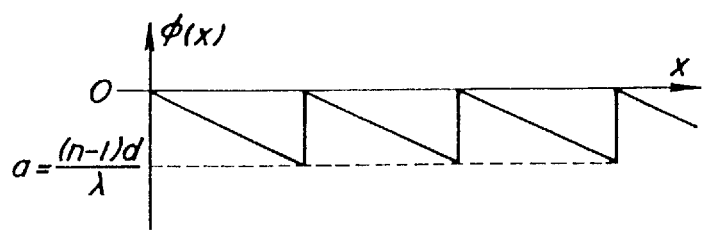
FIG. 3 is a schematic view illustrating a phase shift function φ(x) of a relief pattern having sawtooth cross section.

FIG. 3 represents a phase shift function φ(x) of a relief pattern having a sawtooth cross sectional configuration. This function φ(x) denotes a wave surface modulation of the relief pattern, and is a periodic function corresponding to the cross sectional configuration of the relief pattern. Now it is assumed that a magnitude a of the varying phase shift function is called a phase amplitude. Then, a diffraction efficiency ηm for an m-order of the relief pattern represented by the phase shift function φ(x) shown in FIG. 3 is given as follows:

$$\eta_m = \left\{ \frac{\sin(m-a)\pi}{(m-a)\pi} \right\}^2 \tag{1}$$

In the equation (1), the phase amplitude a may be determined by the following equation:

$$a = \frac{(n-1)d}{\lambda} \tag{2}$$

wherein n represents a refractive index of a substrate material, d denotes a depth of recesses of the relief pattern and λ is a wavelength of light. Further, a refractive index of the air is assumed to be 1. Here, it is further assumed that a depth $d_0$ of recesses optimized for a wavelength $\lambda_0$ such that a diffraction efficiency for $m_0$ order beam becomes 100% may be expressed as follows:

$$d_0 = \frac{m_0 \lambda_0}{n(\lambda_0) - 1} \tag{3}$$

Then, the equation (2) may be rewritten in the following manner:

$$a(\lambda) = m_0 \cdot \frac{n(\lambda) - 1}{n(\lambda_0) - 1} \cdot \frac{\lambda_0}{\lambda} \tag{4}$$

The above equation (4) means that the phase amplitude a depends upon a wavelength for the predetermined recess depth $d_0$, and a wavelength dependency of diffraction efficiency is resulted from the wavelength dependency of phase amplitude a as can be seen from the equation (1).

Figure 4:
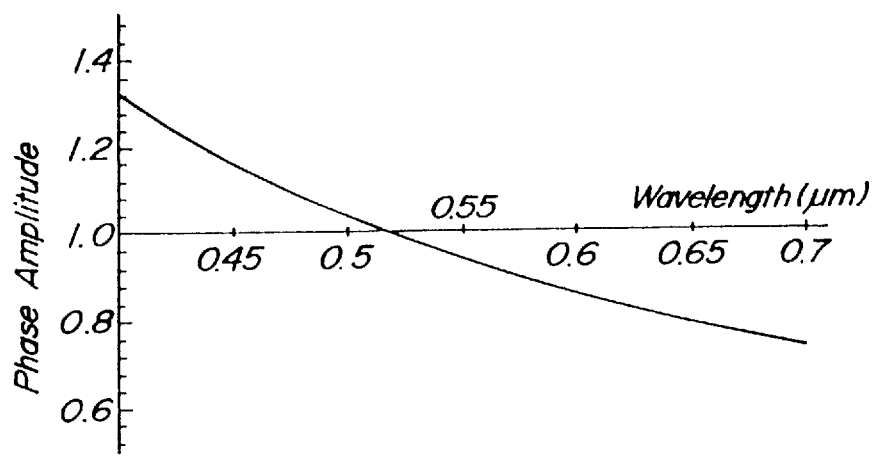
FIG. 4 is a graph showing wavelength dependency of a phase amplitude corresponding to the wavelength dependency of the diffraction efficiency shown in FIG. 2.

FIG. 4 is a graph showing a wavelength dependency of phase amplitude corresponding to a wavelength dependency of diffraction efficiency shown in FIG. 2 of the known diffractive optical element.

In order to explain the wavelength dependency of phase amplitude much more in detail, there are defined elements R(λ) and D(λ) determining the wavelength dependency of phase amplitude expressed by the equation (4).

$$\left. \begin{array}{l} R(\lambda) = \frac{n(\lambda) - 1}{n(\lambda_0) - 1} \\ D(\lambda) = \lambda_0/\lambda \end{array} \right\} \tag{5}$$

Figure 5:
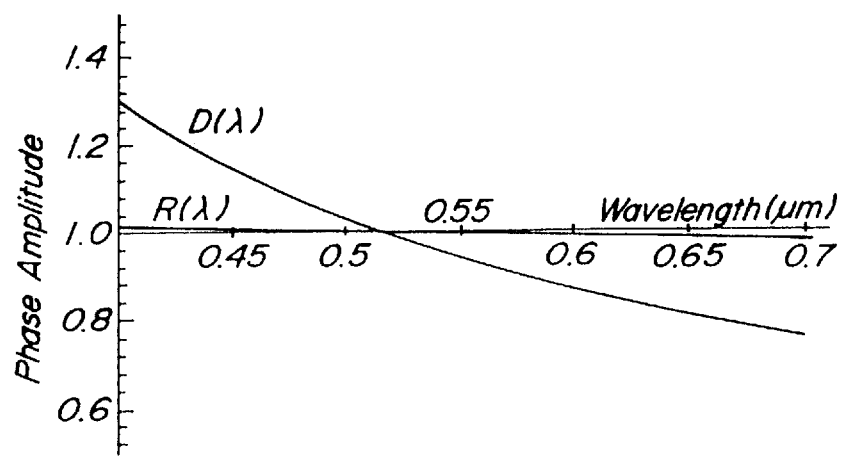
FIG. 5 is a graph representing wavelength dependency of elements R(λ) and D(λ) which determining a wavelength dependency of diffraction efficiency of a phase amplitude shown in FIG. 4.

FIG. 5 is a graph representing wavelength dependencies of phase amplitude of the elements R(λ) and D(λ) defined by the equation (5). As can be seen from FIG. 5, both the R(λ) and D(λ) decrease monotonously in accordance with an increase in a wavelength. It should be noted that a change of D(λ) is larger than that of R(λ). This means that the wavelength dependency of diffraction efficiency of the relief pattern is mainly dependent upon the element D(λ).

After various experiments and analyses, the inventors have found that under certain condition, the element R(λ) can serve to compensate the wavelength dependency of the element D(λ), so that the wavelength dependency of the diffraction efficiency can be improved. That is to say, when the relief pattern is formed in a boundary surface between stacked layers made of different optical materials, one of the optical materials having high refractive index and low dispersion and the other having low refraction index and high dispersion, the wavelength dependency of phase amplitude corresponding to the equation (4) may be represented as follows:

$$a'(\lambda) = m_0 \cdot \frac{n_1(\lambda) - n_2(\lambda)}{n_1(\lambda_0) - n_2(\lambda_0)} \cdot \frac{\lambda_0}{\lambda} \quad (6)$$

From this equation (6), the elements $R'(\lambda)$ and $D(\lambda)$ determining the wavelength dependency of phase amplitude corresponding to the equation (5) may be given in the following manner:

$$\left.\begin{array}{l} R'(\lambda) = \dfrac{n_1(\lambda) - n_2(\lambda)}{n_1(\lambda_0) - n_2(\lambda_0)} \\ D(\lambda) = \lambda_0/\lambda \end{array}\right\} \quad (7)$$

wherein $n_1(\lambda)$ and $n_2(\lambda)$ are refractive indices of the optical material of high refractive index and low dispersion and the optical material of low refractive index and high dispersion, respectively.

As explained above, in the known diffractive optical element, the relief pattern is formed by utilizing a difference in refractive index between the air and the substrate material, but according to the invention, the relief pattern is formed by utilizing a difference in refractive index between the adjacent layers made of different optical materials. Then, according to the invention, the wavelength dependency of diffraction efficiency can be improved by optimizing a combination of the optical materials. According to the invention, the first and second layers are made of different optical materials having refractive indices $n_1(\lambda)$ and $n_2(\lambda)$ which satisfy the following conditions:

$$n_1(\lambda) > n_2(\lambda) \quad (8)$$

$$\left.\dfrac{n_1(\lambda_2) - n_2(\lambda_2)}{n_1(\lambda_1) - n_2(\lambda_1)} > \dfrac{n_1(\lambda_2) - 1}{n_1(\lambda_1) - 1}\right\}$$

wherein $\lambda_1$ and $\lambda_2$ denote shortest and longest wavelengths of a wavelength range within which the diffractive optical element is to be used. Therefore, $\lambda_1 < \lambda < \lambda_2$.

In the known diffractive optical element, the element $R(\lambda)$ in the equation (5) functions to increase the wavelength dependency of diffraction efficiency, while the element $D(\lambda)$ predominantly generates the wavelength dependency of diffraction efficiency. According to the invention, when the optical materials are selected to satisfy the above mentioned condition (8), the element $R'(\lambda)$ defined by the equation (7) serves to decrease the wavelength dependency of diffraction efficiency. It should be noted that according to the invention, the shortest and longest wavelengths $\lambda_1$ and $\lambda_2$ within the wavelength range to be used may be set to arbitrary values. However, it is preferable to set the wavelength range to a visible light range to be used in ordinary cameras, because in this case many commercially available optical materials may be be utilized, so that an optimum combination can be attained easily. Therefore, in a preferable embodiment of the diffractive optical element according to the invention, said $\lambda_1$ and $\lambda_2$ are set to 400 nm and 700 nm, respectively.

It should be noted that a diffractive optical element having a relief pattern formed in a boundary surface between the first and second layers made of different optical materials has been known. For instance, in Japanese Patent Application Laid-open Publication Kokai Hei 2-43503, there is disclosed a first known diffractive optical element, in which a plurality of diffractive lenses are formed in boundaries between different optical materials such that respective diffractive lens elements can have a smaller lens power. This object is entirely different from that of the present invention. Moreover, this reference does not teach anything about characteristics of the optical materials.

In Japanese Patent Application Laid-open Publication Kokai Hei 5-66370, there is disclosed a second known diffractive optical element having a relief pattern formed in a boundary surface between layers made of different optical materials. This second known diffractive optical element is constructed as an optical low pass filter of wavelength selective phase grating type. In this low pass filter, a difference in refractive index for green light between the different optical materials is zero, so that substantially no diffracting operation is performed for the green light and a cut-off frequency near a wavelength of the green light is made high. That is to say, by making dispersions of the optical materials different from each other, a cut-off frequency is decreased as a wavelength departs from the green light wavelength. In this manner, the phase amplitude is increased to enhance the diffracting operation.

In the above mentioned second known diffractive optical element, the relief pattern is formed in the boundary surface of the different optical materials in order to make a difference in refractive index for the green light zero, i,e, to make a phase amplitude zero. This principle is identical with a kind of a switching element disclosed in Japanese Patent Application Laid-open Publication Kokai Sho 64-61726, in which control is performed about a difference in refractive index of zero.

In the present invention, as can be seen from the condition (8), a relationship in magnitude of refractive index of the two optical materials having a boundary surface in which the relief pattern is formed is not changed within the wavelength range to be used. Moreover, in the present invention, by suitably selecting the optical materials, the wavelength dependency of diffraction efficiency is decreased by cancelling the basic function of the element $D(\lambda)$ of the diffractive optical element by means of the element $R'(\lambda)$. This has not been considered in the above mentioned prior art references at all. For instance, in the second prior art reference, the diffraction efficiency is really controlled by making the diffracting operation at the green light zero, but the wavelength dependency of diffraction efficiency for a wavelength range near the green light is not optimally controlled. That is to say, in this second prior art reference, the basic function $D(\lambda)$ of the diffractive optical element is not considered at all. In other words, the present invention is based on a principle which is entirely different from those of the above mentioned prior art references. According to the invention, over the whole wavelength range to be used, the wavelength dependency of diffraction efficiency can be reduced optimally.

Figure 6:
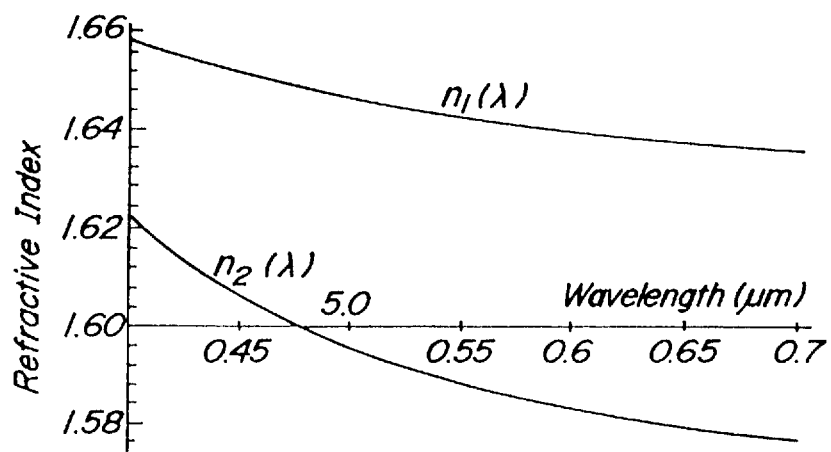
FIG. 6 is a graph denoting a wavelength dependency of optical materials forming the relief pattern in a first embodiment of the diffractive optical element according to the invention.

FIG. 6 is a graph showing a wavelength dependency of refractive index of the two optical materials of the diffractive optical element according to the invention. It should be noted that a difference in refractive index between these optical materials is small for a shorter wavelength range, but is large for a longer wavelength range. When such optical materials are selected, the element $R'(\lambda)$ expressed by the equation (7) increases monotonously and cancels the effect of the element $D(\lambda)$. Therefore, the wavelength dependency of phase amplitude shown by the equation (6) is decreased and the wavelength dependency of diffraction efficiency is improved. In the known diffracting optical element having the relief pattern formed in the surface of the substrate, the element R(λ) is not substantially changed as illustrated in FIG. 5. However, according to the invention, the two optical materials are selected such that the element R'(λ) is increased in accordance with an increase of wavelength.

Figure 8:
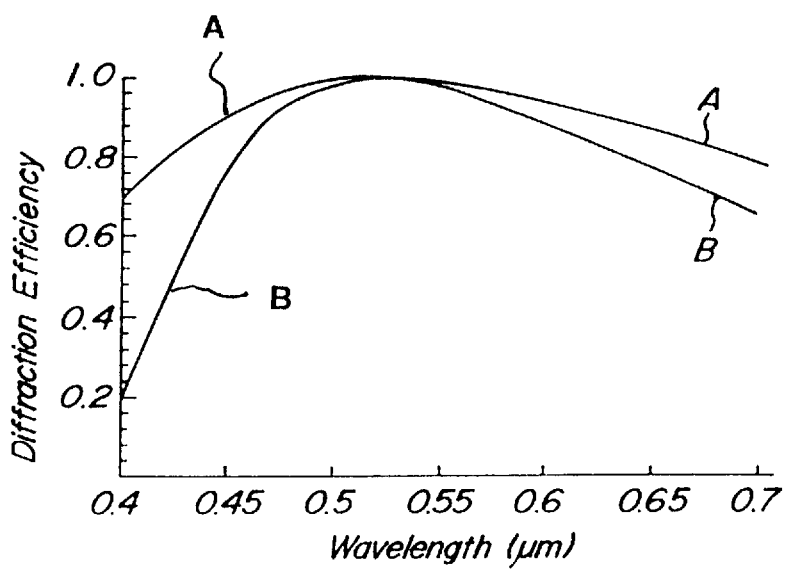
FIG. 8 is a graph representing wavelength dependencies of diffraction efficiency of the known diffractive optical element and a diffractive optical element in which two optical materials are not selected suitably.

When the above mentioned condition (8) is not satisfied upon selecting the two optical materials, the wavelength dependency of diffraction efficiency becomes worse as compared with the known diffractive optical element having the relief pattern formed in the surface of the substrate. For instance, when a relief pattern is formed in a boundary surface between BK7 (low refractive index and high dispersion material) and PC (polycarbonate: high refractive index and low dispersion material), the wavelength dependency becomes as shown by a curve B in FIG. 8 which is worse than that shown by a curve A of the known diffractive optical element in which a relief pattern is formed on a surface of a substrate made of BK7. The curves A and B in FIG. 8 represent the wavelength dependency of diffraction efficiency in a case that a depth of the relief is set such that diffraction efficiency becomes 100% for a wavelength λ=520 nm. In this manner, when a combination of the optical materials is not suitable, the wavelength dependency of diffraction efficiency becomes worse. According to the invention, the optical materials are selected to satisfy the above mentioned condition (8), and then the wavelength dependency of diffraction efficiency can be improved.

Now a depth of recesses of the relief patter in the diffractive optical element according to the invention will be explained. In the present invention, a depth of recesses of the relief pattern formed in the boundary surface between the different optical materials may be expressed by the following equation:

$$d_0 = \frac{m_0 \lambda_0}{n_1(\lambda_0) - n_2(\lambda_0)} \quad (9)$$

wherein the relief pattern is optimized such that the diffraction efficiency of $m_0$ order becomes 100% at a wavelength of $\lambda_0$.

A depth of recesses of the relief pattern in the diffractive optical element is generally larger than that of the known diffractive optical element having the relief pattern formed in the surface of the substrate. When a depth of recesses of the relief pattern becomes larger, an incident angle dependency of diffraction efficiency is increased, and this might cause a problem upon applying the diffractive optical element according to the invention to actual optical systems. Moreover, the relationship denoted by the equation (1) could not be correctly established. The relief pattern having a deep recesses is generally called a thick grating.

In the present invention, a parameter Q characterizing a depth of recesses of a relief pattern is denoted by the following equation (10):

$$Q = \frac{4\pi\lambda d}{n_1(\lambda) + n_2(\lambda)} \cdot \frac{1}{T^2} \quad (10)$$

wherein d is a depth of recesses of the relief pattern and λ is a wavelength.

In general, when Q<1, a relief pattern is classified into a thin relief pattern. Therefore, also in the diffractive optical element according to the invention, it is preferable to set a pitch T of the relief pattern such that the above condition Q<1 is satisfied. That is, it is preferable to satisfy the following condition:

$$T^2 > \frac{4\pi\lambda d}{n_1(\lambda) + n_2(\lambda)} \quad (11)$$

The inventors have found after various experiments that a characteristic of the thin relief pattern can be attained by satisfying a condition of Q<0.1. Therefore, in a preferable embodiment of the diffractive optical element according to the invention, the relief pattern is formed to satisfy the following condition:

$$T^2 > \frac{40\pi\lambda d}{n_1(\lambda) + n_2(\lambda)} \quad (12)$$

Now several embodiments of the diffractive optical element according to the invention will be explained in detail.

Figure 7:
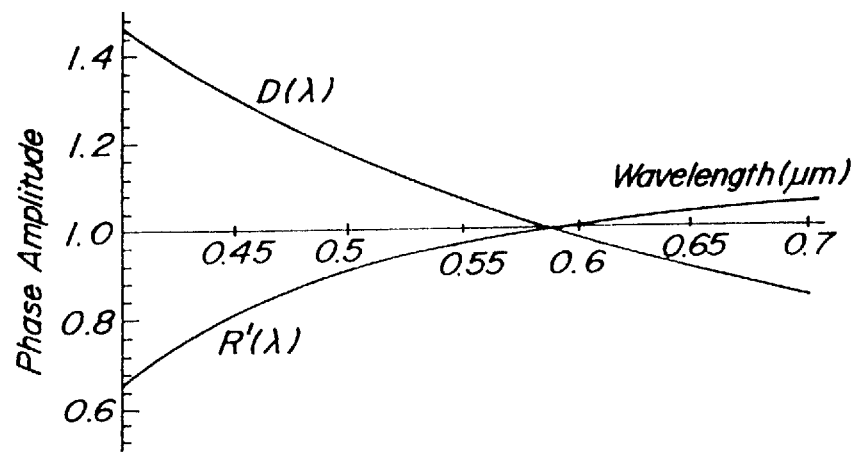
FIG. 7 is a graph showing a wavelength dependency of elements R'(λ) and D(λ) determining a wavelength dependency of a phase amplitude of the optical materials shown in FIG. 6.

In a first embodiment, a relief pattern is formed in a boundary surface between an optical glass BSM81 (manufactured by OHARA Company) and an optical plastics of PC (polycarbonate). The wavelength dependencies of these optical materials are shown in FIG. 6. The curve denoted by $n_1(\lambda)$ represents the wavelength dependency of the BSM 81 glass (high refractive index and low dispersion material) and the curve represented by $n_2(\lambda)$ shows the wavelength dependency of PC (low refractive index and high dispersion material). A function of such a combination of the optical materials to the wavelength dependency of phase amplitude has been explained with reference to FIG. 7. Therefore, an improvement in the wavelength dependency of phase amplitude by such a combination will be explained here with reference to FIG. 9.

In FIG. 9, a curve A denotes the wavelength dependency of the known diffractive optical element in which a relief pattern is formed in a surface of a substrate made of BSM81 glass and a curve B shows the wavelength dependency of the embodiment of the diffractive optical element according to the invention, in which the relief pattern is formed in the boundary surface of the above mentioned optical materials, i.e. BSM81 and PC. In the case of the curve A, the diffraction efficiency is optimized to be 100% for a wavelength of 520 nm and in a case of the curve B, an optimization is performed for d-line of a wavelength of 587.56 nm. In the present embodiment, an improvement in diffraction efficiency is remarkable for a shorter wavelength range, so that a wavelength for optimization is preferably set to a longer wavelength. Then, a variation of the phase amplitude can be suppressed over a wide wavelength range to be used.

FIG. 10 is a graph showing the wavelength dependency of diffraction efficiency corresponding to the wavelength dependency of phase amplitude shown in FIG. 9. A curve A represents the wavelength dependency of the known diffractive optical element and a curve B denotes the wavelength dependency of the preset embodiment using the above mentioned optical materials (BSM81 and PC). As can be read from the curves A and B in FIG. 10, in the present embodiment, the wavelength dependency of diffraction efficiency can be suppressed substantially to a negligibly small value.

In the present embodiment, polycarbonate PC is used as the plastic optical material PC, but other plastic optical materials may be used, because ordinary plastic optical materials have low refractive index and high dispersion. Moreover, plastic optical materials can be easily molded into desired shapes, so that the diffractive optical element can be manufactured much more easily.

In the present embodiment, the relief pattern is formed in the boundary surface between the two different optical materials, and thus the relief pattern can be free from dusts, fingerprints and injury. Therefore, the diffractive optical element can be effectively protected from severe environments. When the relief pattern is formed in the surface of the substrate, it would be rather difficult to remove dusts and fingerprints left on the relief pattern.

Now the construction of the diffractive optical element of the present embodiment will be explained in greater detail.

FIG. 11 is a cross sectional view illustrating a first embodiment of the diffractive optical element according to the invention. In the present embodiment, the diffractive optical element serves as a prism. To this end, in a boundary surface between a first optical material layer 11 made of PC and a second optical material layer 12 made of BSM81 glass, there is formed a relief pattern of a sawtooth shape having a constant pitch. Outer surfaces 31 and 32 of the first and second optical material layers 11 and 12 are formed to be flat.

FIG. 12 is a cross sectional view depicting a second embodiment of the diffractive optical element according to the invention. In this embodiment, in the boundary surface between the PC layer 11 and BSM81 glass layer 12 there is formed a relief pattern 23 having such a shape that the diffractive optical element serves as a converging lens. To this end, an outer surface 31 of the first PC layer 11 is formed into a curved shape.

In the first and second embodiments of the diffractive optical elements shown in FIGS. 11 and 12, a light beam impinging upon the optical element is bent into a given direction. This light beam bending operation of the diffractive optical element including both the diffractive plane and the refractive plane does not substantially have a wavelength dependency. This is due to the fact that the wavelength dependency at the surface of the relief pattern 21 or 23 and that at the outer surfaces 31 and 32 become complemental to each other, so that chromatic aberration can be cancelled out.

FIG. 13 is a cross sectional view showing a third embodiment of the diffractive optical element according to the invention. In the present embodiment, a relief pattern 22 having a rectangular cross sectional shape is formed in the boundary surface between the first PC layer 11 and the second BSM81 glass layer 12. When the relief pattern 22 is formed as rectangular shape, there are produced a plurality of diffracted beams and the wavelength dependency of intensity distribution of each of these diffracted beams can be suppressed. Therefore, such a diffractive optical element is preferably used as a spatial low pass filter in which the wavelength dependency of cut-off frequency has been decreased.

FIG. 14 is a cross sectional view showing a third embodiment of the diffractive optical element according to the invention. In the present embodiment, three layers 11, 12 and 13 are provided and two relief patterns 21 and 22 are formed in boundary surfaces of these layers. The middle layer 12 is made of PC or BSM81 glass and the outer layers 11 and 13 are made of BSM81 glass or PC, or three layers are made of different optical materials. The present embodiment may be advantageously utilized to an application in which a light bending angle is limited due to pattern pitch, because a light bending amount by respective patterns (diffraction surface) can be reduced. Therefore, it is possible to attain a desired property easily. Outer surfaces 31 and 35 of the first and third layers 11 and 13 are made flat.

FIG. 15 is a cross sectional view illustrating a fourth embodiment of the diffractive optical element according to the invention. Also in the present embodiment, there are provided three layers 11, 12 and 14, a relief pattern 23 is formed in the boundary surface between the first and second layers 11 and 12 and a spherical surface is formed in the boundary surface between the second and third layers 12 and 14. In the present embodiment, the first and second layers 11 and 12 may be made of different optical materials such as PC and BSM81 glass and the third layer 14 may be made of any desired optical material. Also in this embodiment, outer surfaces 31 and 36 of the first and third layers 11 and 14 are made flat.

Figure 16:
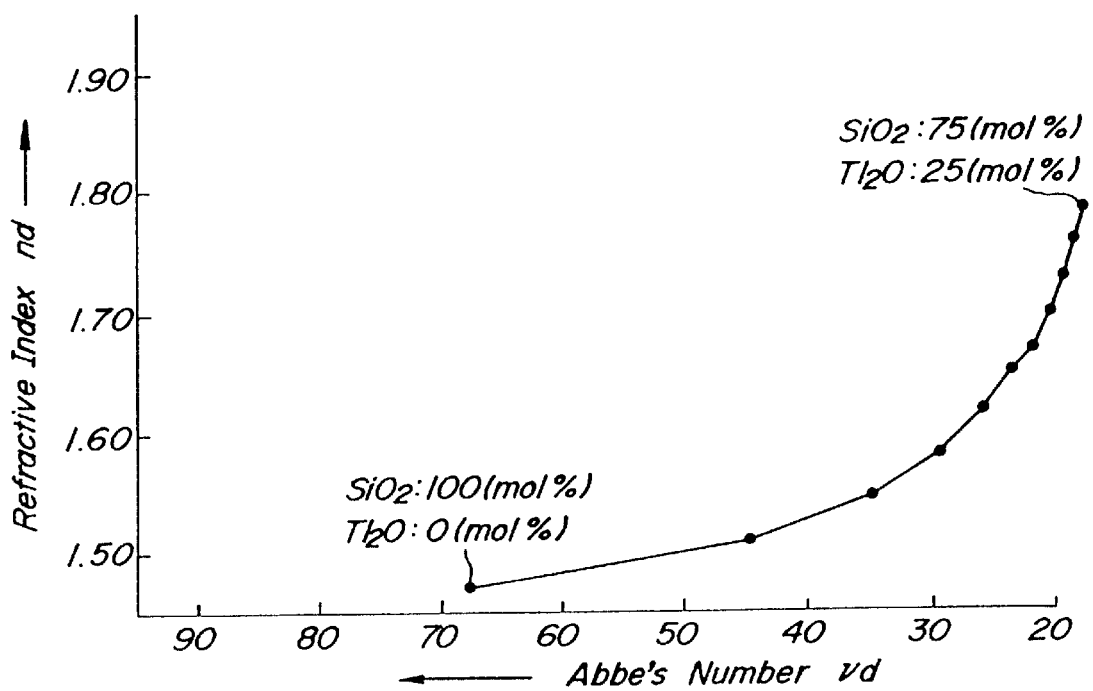
FIG. 16 is a graph showing variations in refractive index and dispersion of optical materials in which $Tl_2O$ is added to $SiO_2$ by 0 mol % to 25 mol %.

According to another aspect of the invention, the optical material having low refractive index $n_2(\lambda)$ and high dispersion is formed by glass containing at least $Tl_2O$. In general, when $Tl_2O$ is added to a glass material, both refractive index and dispersion are increased. When an amount of $Tl_2O$ is small, an increase in refractive index is small, but dispersion is increased abruptly, and when an amount of $Tl_2O$ is increased, an increase in refractive index becomes abrupt, but an increase in dispersion is small. FIG. 16 is a glass map showing a change in refractive index and Abbe's number when $Tl_2O$ is added to $SiO_2$ glass (silicate glass) by an amount changing from 0 mol % to 25 mol %. It should be noted that Abbe's number in inversely proportional to dispersion.

As can be seen from FIG. 16, $SiO_2$–$Tl_2O$ glass has low refractive index and high dispersion as compared with the commercially available silicate glass, so that $SiO_2$–$Tl_2O$ glass can be advantageously used as the optical material having low refraction index $n_2(\lambda)$ and high dispersion. Then, the optical material having high refractive index $n_1(\lambda)$ and low dispersion may be easily selected from many commercially available glass materials.

According to the invention, the optical material having low refractive index $n_2(\lambda)$ and high dispersion is not limited to the above mentioned two-component glass of $SiO_2$–$Tl_2O$, but may contain other substances which can change refractive index and/or dispersion. By suitably selecting additives and amounts thereof, refractive index and dispersion of glass can be changed in various ways, so that various kinds of glass materials distributed near the curve shown in FIG. 16 may be realized.

According to the invention, $Tl_2O$ may be added to glass materials other than $SiO_2$ glass. For instance, $Tl_2O$ may be added to $B_2O_3$ (boron oxide glass). When a basic or substrate glass material is changed, a start point of the curve shown in FIG. 16 is shifted on the glass map and further refractive index and dispersion are also changed. Therefore, a combination of the two different optical materials may be selected from a wider range.

In this manner, by suitably selecting a starting glass material, additives and amounts of additives, it is possible to attain a glass material situating at any desired point on the glass map. It should be noted that when $Tl_2O$ is added more than 30 mol %, it is difficult to constitute a glass, so that it is preferable that an amount of $Tl_2O$ is smaller than 30 mol %.

Further, in view of a pitch, an amount of $Tl_2O$ contained in a glass having low refractive index and high dispersion is preferable larger than 7.5 mol %. Then, the $Tl_2O$ containing glass may be advantageously combined with commercially available glasses having high refractive index $n_1(\lambda)$ and low dispersion. In this case, the right hand term of the equation (11) may be smaller than a value which is obtained by using plastic optical material as the optical material having low refractive index and high dispersion. Therefore, a pitch of a relief pattern may be made much smaller, and thus a light bending angle may be increased. In this manner, an applicability of the diffractive optical element according to the invention can be widened.

In this embodiment, the first and second layers are made of an optical glass LA11 (manufactured by OHARA) and an SiO$_2$–Tl$_2$O glass (Tl$_2$O: 8.75 mol %), respectively. FIG. 17 shows wavelength dependencies of refractive index of these optical glass materials. A curve n$_1$($\lambda$) denotes the wavelength dependency of LA11 glass serving as the optical material having high refractive index and a curve n$_2$($\lambda$) represents the wavelength dependency of the SiO$_2$–Tl$_2$O glass used as the optical material having low refractive index and high dispersion.

FIG. 18 represents wavelength dependencies of phase amplitude. A curve A denotes the wavelength dependency of phase amplitude of the known diffractive optical element in which a relief pattern is formed in a surface of a substrate made of LA11 glass and a curve B represents the wavelength dependency of the present embodiment of the diffractive optical element according to the invention in which a sawtooth relief pattern is formed in the boundary surface between the different optical materials LA11 glass and SiO$_2$–Tl$_2$O glass. It should be noted that the known diffractive optical element is optimized at a wavelength of 510 nm and the present embodiment according to the invention is optimized at the d-line (587.56 nm). Also in the present embodiment, the improvement in the wavelength dependency is remarkable for a lower wavelength range, so that the optical element is preferably optimized to attain the maximum diffraction efficiency at a relatively longer wavelength as compared with the known element.

According to the invention, the first and second layers may be made of various kinds of different optical materials. For various kinds of combinations of different optical materials, the diffraction efficiencies for a wavelength range from 400 nm to 700 nm are shown in the following table 1. In this table, the diffraction efficiency of the known diffractive optical elements are also shown. In this table 1, an upper line of a respective column denotes commercially available glasses (optical material 1) and a lower lined indicates SiO$_2$–Tl$_2$O glasses having Tl$_2$O contained by an amount indicated by mol % (optical material 2). In the known diffractive optical elements, relief patterns are formed in outer surfaces of substrates made of optical materials listed in upper lines in respective columns. In the diffractive optical elements according to the invention, relief patterns are formed in boundary surfaces between optical materials 1 and 2 listed in upper and lower lines. As can be understood from the table 1, in the diffractive optical elements according to the invention, the wavelength dependency of diffraction efficiency can be improved remarkably. That is to say, the diffraction efficiency can be maintained higher than 90% over the whole wavelength range from 400 nm to 700 nm.

TABLE 1

| Material 1: usual glass Material 2: SiO$_2$—TL$_2$O | $\lambda$ (nm) | Diffraction Efficiency | | | | | | |
|---|---|---|---|---|---|---|---|---|
| | | 400 | 450 | 500 | 550 | 600 | 650 | 700 |
| BSL 7 | Prior Art | 0.7373 | 0.9343 | 0.9985 | 0.9808 | 0.9212 | 0.8444 | 0.7640 |
| 2.00(mol %) | Invention | 0.9953 | 0.9920 | 0.9897 | 0.9971 | 0.9996 | 0.9899 | 0.9673 |
| BAL 5 | Prior Art | 0.7279 | 0.9322 | 0.9985 | 0.9804 | 0.9198 | 0.8421 | 0.7610 |
| 3.75(mol %) | Invention | 0.9966 | 0.9912 | 0.9894 | 0.9971 | 0.9996 | 0.9900 | 0.9677 |
| BAL 50 | Prior Art | 0.7351 | 0.9338 | 0.9985 | 0.9807 | 0.9208 | 0.8438 | 0.7632 |
| 4.00(mol %) | Invention | 0.9932 | 0.9926 | 0.9899 | 0.9972 | 0.9996 | 0.9899 | 0.9670 |
| BAL 22 | Prior Art | 0.7366 | 0.9341 | 0.9985 | 0.9807 | 0.9211 | 0.8442 | 0.7637 |
| 4.50(mol %) | Invention | 0.9586 | 0.9994 | 0.9947 | 0.9980 | 0.9997 | 0.9918 | 0.9719 |
| BAL 42 | Prior Art | 0.7336 | 0.9335 | 0.9985 | 0.9806 | 0.9206 | 0.8435 | 0.7628 |
| 5.00(mol %) | Invention | 1.0000 | 0.9815 | 0.9861 | 0.9966 | 0.9996 | 0.9885 | 0.9638 |
| BSM 7 | Prior Art | 0.7335 | 0.9335 | 0.9985 | 0.9806 | 0.9206 | 0.8435 | 0.7628 |
| 6.25(mol %) | Invention | 0.9920 | 0.9932 | 0.9901 | 0.9972 | 0.9996 | 0.9900 | 0.9674 |
| BSM 81 | Prior Art | 0.7346 | 0.9337 | 0.9985 | 0.9806 | 0.9207 | 0.8436 | 0.7629 |
| 7.50(mol %) | Invention | 1.0000 | 0.9842 | 0.9855 | 0.9964 | 0.9996 | 0.9884 | 0.9627 |
| LAL 11 | Prior Art | 0.7319 | 0.9331 | 0.9985 | 0.9805 | 0.9203 | 0.8430 | 0.7622 |
| 8.75(mol %) | Invention | 0.9913 | 0.9933 | 0.9901 | 0.9972 | 0.9996 | 0.9899 | 0.9670 |
| LAL 12 | Prior Art | 0.7302 | 0.9327 | 0.9985 | 0.9805 | 0.9201 | 0.8425 | 0.7615 |
| 10.00(mol %) | Invention | 0.9744 | 0.9977 | 0.9930 | 0.9977 | 0.9997 | 0.9908 | 0.9693 |
| LAL 18 | Prior Art | 0.7298 | 0.9326 | 0.9985 | 0.9804 | 0.9200 | 0.8424 | 0.7613 |
| 12.50(mol %) | Invention | 0.9847 | 0.9954 | 0.9913 | 0.9974 | 0.9996 | 0.9902 | 0.9676 |
| YGH 51 | Prior Art | 0.7275 | 0.9321 | 0.9985 | 0.9803 | 0.9196 | 0.8417 | 0.7605 |
| 15.00(mol %) | Invention | 0.9739 | 0.9977 | 0.9928 | 0.9976 | 0.9997 | 0.9908 | 0.9691 |
| LAH 67 | Prior Art | 0.7185 | 0.9301 | 0.9984 | 0.9799 | 0.9182 | 0.8395 | 0.7576 |
| 17.50(mol %) | Invention | 0.9915 | 0.9931 | 0.9899 | 0.9971 | 0.9996 | 0.9897 | 0.9663 |
| LAH 55 | Prior Art | 0.7145 | 0.9293 | 0.9984 | 0.9797 | 0.9176 | 0.8385 | 0.7563 |
| 20.00(mol %) | Invention | 0.9934 | 0.9921 | 0.9893 | 0.9970 | 0.9996 | 0.9895 | 0.9659 |
| LAH 57 | Prior Art | 0.7123 | 0.9288 | 0.9984 | 0.9796 | 0.9173 | 0.8379 | 0.7557 |
| 22.50(mol %) | Invention | 0.9644 | 0.9989 | 0.9939 | 0.9979 | 0.9997 | 0.9913 | 0.9705 |
| LAH 75 | Prior Art | 0.6982 | 0.9258 | 0.9984 | 0.9791 | 0.9153 | 0.8347 | 0.7515 |
| 25.00(mol %) | invention | 0.9069 | 0.9990 | 0.9978 | 0.9987 | 0.9998 | 0.9932 | 0.9758 |

In the Table 1, the wavelength range is set to 400 nm to 700 nm, but according to the invention. The lower and upper limits of the wavelength range may be set at will. However, almost all optical devices are used under the visible light, and further there are many optical materials which may be used in the above wavelength range, which is preferable to perform the optimization. Therefore, it is practically preferable to apply to the visible light range.

It should be further noted that an amount of Tl$_2$O may be changed continuously so as to obtain glass materials having properties distributed along the curve shown in FIG. 16. Moreover, it is also possible to add substances other than Tl$_2$O for finely adjusting refractive index and dispersion. Then, various glasses having property slightly shifted from the curve in FIG. 16 may be obtained. Furthermore, the basic glass material may be changed from SiO$_2$ into other materials such as $B_2O_3$. Also in this case, by changing an amount of $Tl_2O$, the refractive index and dispersion of $B_2O_3$–$Tl_2O$ glass may be adjusted.

As explained above, by adjusting an amount of $Tl_2O$ added to the starting glass material, it is possible to obtain a glass material having a desired low refractive index and high dispersion property. Therefore, various kinds of optical materials having high refractive index and low dispersion may be advantageously combined with the glass material. In other words, many combinations satisfying the condition (8) can be easily found by using commercially available optical glasses.

The diffractive optical element comprising the above mentioned glass materials may be designed in the same manner as those of the embodiments shown in FIGS. 11–15. For instance, in an embodiment similar to the embodiment illustrated in FIG. 11, the first layer 11 is made of an $SiO_2$–$Tl_2O$ glasses, the second layer 13 is made of LA11 glass, and the sawtooth relief pattern 21 having a constant pitch is formed in the boundary surface between the first and second layers.

The present embodiment is not limited to the embodiments explained above, but many modifications and alternations may be conceived by those skilled in the art within the scope of the invention. For instance, in the embodiments illustrated in FIGS. 11–15, the diffractive optical elements are constructed as the transmission type optical element, but according to the invention it is also possible to construct a reflection type diffractive optical element by applying a mirror coating on an outer surface. For instance, as shown in FIG. 20, a relief pattern 21 is formed in a boundary surface between first and second layers 11 and 12, and a mirror coating 34 is applied on an outer surface of the second layer 12. It should be noted that a thickness of the second layer 12 is substantially equal to a height of the relief pattern 21. In this diffractive optical element, light is made incident upon an outer surface 31 of the first layer 11. In this case, the relief pattern 21 performing the wave surface modulation situates in a proximity of the mirror coating 34, so that a reflection type diffraction grating can be practically realized by the reflection type diffractive optical element of the present embodiment.

Furthermore, in order to improve an efficiency of utilizing light, antireflection coatings may be applied on surfaces in which relief patterns and reflection coatings are not formed.

As explained above, in the diffractive optical element according to the invention, since the wavelength dependency of diffraction efficiency can be effectively reduced, it is possible to prevent generation of undesired color variation and flare due to undesired order beams when the optical element is applied to an optical system such as camera utilizing white light. Further, since the relief pattern is formed in the boundary surface between layers made of different optical materials, the relief pattern can be effectively protected against severe environments.

What is claimed is:

1. A diffractive optical element comprising a plurality of layers including at least one boundary surface formed by adjacent layers made of different optical materials and at least one relief pattern formed in said at least one boundary surface, wherein at least first and second adjacent layers between which said relief pattern is formed are made of optical materials having refractive indices $n_1(\lambda)$ and $n_2(\lambda)$, which are refractive indices of one of said optical materials having a high refractive index and low dispersion and one of said optical materials having a low refractive index and high dispersion, respectively, and which satisfy the following conditions:

$n_1(\lambda) > n_2(\lambda)$ and $$\frac{(n_1(\lambda_2) - n_2(\lambda_2))}{(n_1(\lambda_1) - n_2(\lambda_1))} > \frac{(n_1(\lambda_2) - 1)}{(n_1(\lambda_1) - 1)}$$

wherein $\lambda_1$ is a short wavelength of 400 nm, $\lambda_2$ is a long wavelength of 700 nm, and $\lambda$ is an arbitrary wavelength between said short and long wavelengths, $\lambda_1$ and $\lambda_2$, and wherein the relief pattern is formed such that a depth d and a pitch T of recesses of relief pattern satisfy the following condition:

$$T^2 > \frac{4\pi\lambda d}{n_1(\lambda) + n_2(\lambda)}.$$

2. A diffractive optical element according to claim 1, wherein said relief pattern is formed to have a sawtooth cross sectional configuration.

3. A diffractive optical element according to claim 1, wherein said relief pattern is formed to have a lens function.

4. A diffractive optical element according to claim 1, wherein at least one antireflection coating is applied on at least one outer surface of the optical element on which said relief pattern is not formed.

5. A diffractive optical element according to claim 1, wherein at least one outer surface of the optical element in which said relief pattern is not formed is shaped into a curved surface.

6. A diffractive optical element according to claim 1, wherein at least one mirror coating is applied to at least one outer surface of the optical element.

7. A diffractive optical element according to claim 6, wherein said mirror coating is applied on the outer surface of an outer layer and said relief pattern is formed in a boundary surface between said outer layer and an adjacent layer made of different optical materials, and a thickness of said outer layer is substantially equal to a depth of recesses of the relief pattern.

8. A diffractive optical element according to claim 1, wherein at least one of the first and second layers is made of plastic material.

9. A diffractive optical element comprising:

a plurality of layers including at least one boundary surface formed by adjacent layers made of different optical materials and at least one relief pattern formed in said at least one boundary surface, wherein at least first and second adjacent layers between which said relief pattern is formed are made of optical materials having refractive indices $n_1(\lambda)$ and $n_2(\lambda)$, which are refractive indices of one of said optical materials having a high refractive index and low dispersion and one of said optical materials having a low refractive index and high dispersion, respectively, and which satisfy the following conditions for arbitrary wavelengths $\lambda_1$ and $\lambda_2$, respectively of light transmitting through the diffractive optical element:

$n_1(\lambda) > n_2(\lambda)$ and $$\frac{(n_1(\lambda_2) - n_2(\lambda_2))}{(n_1(\lambda_1) - n_2(\lambda_1))} > \frac{(n_1(\lambda_2) - 1)}{(n_1(\lambda_1) - 1)}$$

wherein $\lambda_1 < \lambda < \lambda_2$, and wherein said relief pattern is formed such that a depth d and a pitch T of recesses of relief pattern satisfy the following condition:

$$T^2 > \frac{4\pi\lambda d}{n_1(\lambda) + n_2(\lambda)} .$$

* * * * *